June 8, 1948. I. NESSON 2,443,113
WINDSHIELD WIPER ARM ATTACHMENT
Filed March 31, 1945
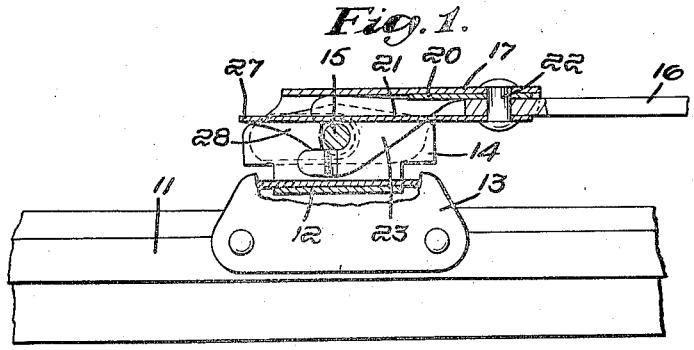
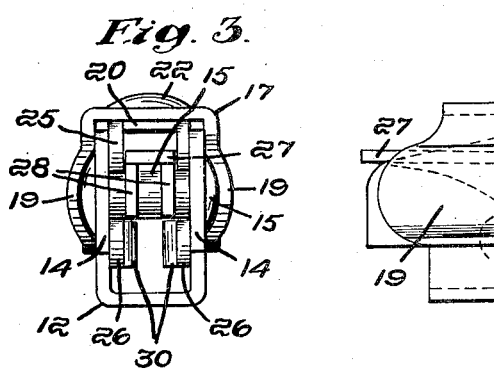
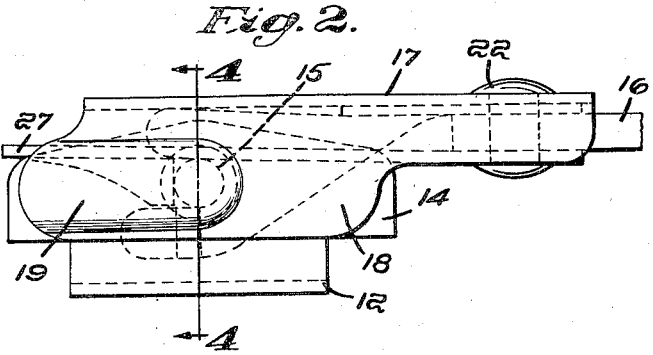
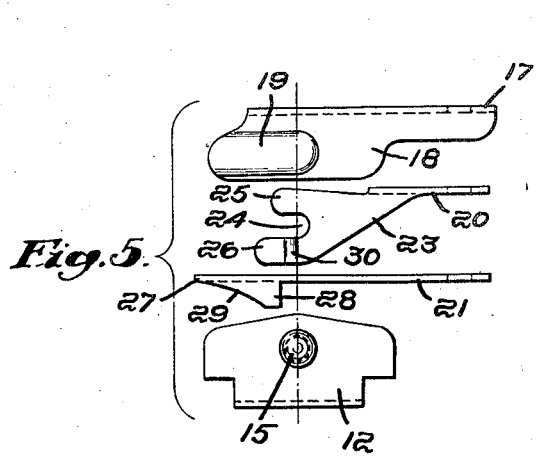
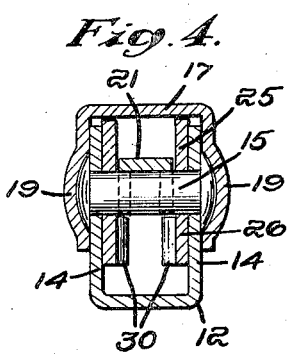
Inventor:
Israel Nesson,
by Thomson & Thomson
Attorneys Patented June 8, 1948

2,443,113

UNITED STATES PATENT OFFICE 2,443,113

WINDSHIELD WIPER ARM ATTACHMENT

Israel Nesson, Lynn, Mass., assignor to Max Zaiger, Swampscott, Mass.

Application March 31, 1945, Serial No. 585,924

5 Claims. (Cl. 15—250)

This invention relates to windshield wiper attachments, and pertains more particularly to improvements in the separable coupling between the end of the wiper arm and the clip or hanger carried by the wiper blade.

The principal purpose of the invention is to provide a durable, efficient and easily operable coupling which ensures a smooth, noiseless pivotal connection between the arm and blade and which locks the parts together until an automatically actuated latch is manually released.

Further objects of the invention reside in the improved features of the attachment hereinafter described in connection with the recommended embodiment shown in the accompanying drawings, as set forth in the appended claims; but it will be understood that the structural details of the device herein illustrated and described may be varied to suit particular installations without departing from the essence of the invention as defined in said claims. In the drawings, Fig. 1 is a side view of the central portion of a wiper blade and the end portion of a wiper arm with the improved coupling devices and associated parts of the blade and arm shown in section;

Fig. 2 is an enlarged side view of the assembled coupling;

Fig. 3 is an end view of the coupling, looking to the right of Fig. 2;

Fig. 4 is a section on line 4—4 of Fig. 2; and

Fig. 5 is an exploded view of the coupling elements, in side elevation, on the scale of Fig. 1.

The wiper blade 11 is equipped with a clip or connector 12 which may be hinged to a sub-clip or saddle 13 as described in Zaiger Patent No. 2,280,566, issued April 21, 1942. The clip 12 consists of a U-shaped metal stamping having upstanding sides 14 apertured to receive a pivot pin 15 which may be a double headed rivet as shown. The clip may be permanently or detachably connected to the blade saddle 13, or directly attached to the blade, as desired, so that it is normally carried by the blade.

The forward end of the wiper arm 16 is equipped with a U-shaped end piece or housing 17 having depending sides 18 which embrace and shield the clip sides 14 and which are preferably formed with outwardly deflected channel portions 19 adapted to receive the heads of the pivot 15 when the parts are slid together. The arm end also carries a pivot-engaging, bearing member 20 and a latch member 21, and the rearward portions of these members as well as the rearward part of the housing 17 in which said parts are disposed, may be affixed to the arm by a common rivet 22, or other fastening. The latch bar 21 is preferably resilient and mounted on the underside of the arm end in spaced parallel relation to the top portions of the parts 17 and 20, so that the latch may yield upwardly when the coupling elements are connected or be moved upwardly to release them, as hereinafter explained.

The bearing member 20 has depending side portions 23 fitting between the clip sides 18 and notched at 24 to receive the pivot 15 and provide a bearing thereon between the hooks or tongues 25 and 26 at the forward end of the member 20. The slots or recesses 24 are disposed parallel to the top of the housing or shield 17, so that the elements may be connected by a forward, endwise movement of the arm relative to the blade, thereby engaging the pivot in said recesses.

The latch bar 21 consists of a formed spring member having a forward tip 27 projecting beyond the sides 14 of the shield 17, when the parts are connected as shown in Figs. 1 and 2, where it may be lifted by a finger; and one or more latching dogs 28 depend from its forward end between the side portions 23 and normally engage in front of the pivot 15 to lock the coupling elements in operative position. The bottom edges 29 of the downwardly projecting dogs 28 are inclined toward the tip 27 and preferably concaved slightly, so that they will readily ride over the pivot 15 and thus elevate the latch bar when the coupling is connected by an endwise movement of the wiper arm, as aforesaid. After the dogs have passed over the pivot, they automatically drop into locking position in front of the pivot, under spring tension of the resilient latch bar.

The latch bar of the detached wiper arm is preferably supported by stop members, so that its tip 27 will be disposed above the pivot 15 and permit the dogs to slide over the pivot, when the arm is connected to the blade in the manner described. For this purpose, the lower tongues 26 of the bearing member 20 are bent inwardly to provide indented stops 30 engageable by the bottom edges of the respective dogs 28 to limit downward movement of the latch bar.

By utilizing the improved coupling herein described, the arm 16 is thus securely attached to the wiper blade 11 and the pivotal connection allows free swinging movement of the arm relative to the blade, without the noise and wear characteristic of convention attachments which are not only loose and inefficient but also likely to become disconnected when the blade is raised from the windshield. The coupling is easily assembled and effectively locked against accidental separation, regardless of the relative angular positions of the arm and blade, yet the latch may be quickly released merely by lifting its protruding tip with the thumb or finger. The shield 17 serves to enclose and conceal the coupling elements, and provides a protective housing having a smooth, unbroken surface which resists rusting and enhances the appearance of the assembled coupling.

It will be understood that the rearward end of the wiper arm (not shown) may be suitably connected to a motor which swings the arm and wiper blade across the surface of a windshield; and it will be observed that the bearing and locking elements of the coupling are carried by the wiper arm which seldom requires replacement, whereas the connector on the wiper blade, which frequently requires replacement, is of relatively simple and economical construction.

I claim:

1. A coupling for separably and pivotally connecting a windshield wiper arm to a wiper blade, comprising a clip carried by the blade and having spaced sides and a pivot pin extending between said sides, a housing carried by the wiper arm and having sides adapted to embrace the clip sides, a pivot-pin engaging member fixed between the sides of the housing and having a depending portion provided with an end recess adapted to receive the pivot pin and constitute a bearing thereon, and a movable latch fixed relative to the end of the arm and having a downwardly projecting dog adapted to engage the pivot pin for releasably locking said member on said pin, the latch being moved by manual pressure when the coupling is to be detached, said dog having a bottom surface inclined toward the forward end of the latch and adapted to ride over the pivot pin and elevate the latch while the parts are being coupled by endwise movement of the wiper arm relative to the blade clip.

2. A coupling for separably and pivotally connecting a windshield wiper arm to a wiper blade, comprising a clip fastened to the blade and having upstanding sides and a pivot pin extending between said sides, a shield carried by the wiper arm and having depending sides adapted to embrace the clip sides, a pivot-pin engaging member fastened to the arm and having spaced side portions receivable between the sides of the clip, said side portions having ends and end slots adapted to receive said pivot pin and constitute a bearing thereon, and a flexible and resilient latch bar fixed to the arm between said side portions and adapted to engage the pivot pin for releasably locking the coupling elements, the latch being manually movably flexed to unlock the coupling.

3. A coupling for separably and pivotally connecting a windshield wiper arm to a wiper blade, comprising a clip fastened to the blade and having upstanding sides and a pivot pin extending between said sides, a shield carried by the wiper arm and having depending sides adapted to embrace the clip sides, a pivot-pin engaging member fastened to the arm and having spaced side portions receivable between the sides of the clip, said side portions having end slots adapted to receive said pivot pin and constitute a bearing thereon, and a resilient latch bar fixed to the arm and movable upwardly and downwardly between said side portions and adapted to engage the pivot pin for releasably locking the coupling elements, said latch bar having a pair of spaced, depending dogs, each having an inclined edge slidable over the pivot pin when the parts are being coupled by endwise movement of the wiper arm relative to the clip, thereby automatically to lock the parts together when the dogs pass over and drop in front of the pivot pin.

4. A coupling for separably and pivotally connecting a windshield wiper arm to a wiper blade, comprising a clip fastened to the blade and having upstanding sides and a pivot pin extending between said sides, a shield carried by the wiper arm and having depending sides adapted to embrace the clip sides, a pivot-pin engaging member fastened to the arm and having spaced side portions receivable between the sides of the clip, said side portions having end slots adapted to receive said pivot pin and constitute a bearing thereon, and a resilient latch bar fixed to the arm and movable upwardly and downwardly between said side portions and adapted to engage the pivot pin for releasably locking the coupling elements, said latch bar having a pair of spaced, depending dogs, each having an inclined edge slidable over the pivot pin when the parts are being coupled by endwise movement of the wiper arm relative to the clip, thereby automatically to lock the parts together when the dogs pass over and drop in front of the pivot pin, the sides of said member having indented stops engageable by said dogs to limit downward movement of the latch bar.

5. A coupling for separably and pivotally connecting a windshield wiper arm to a wiper blade, comprising a clip fastened to the blade and having upstanding sides and a pivot pin extending between said sides, a shield carried by the wiper arm and having depending sides adapted to embrace the clip sides, a pivot-pin engaging member fastened to the arm and having spaced side portions receivable between the sides of the clip, said side portions having end slots adapted to receive said pivot pin and constitute a bearing thereon, and a resilient latch bar fixed to the arm and movable upwardly and downwardly between said side portions and adapted to engage the pivot pin for releasably locking the coupling elements, said latch bar having a pair of spaced, depending dogs each having an inclined edge slidable over the pivot pin when the parts are being coupled by endwise movement of the wiper arm relative to the clip, thereby raising the latch bar, said bar springing to locking position when the dogs pass over and drop in front of the pivot pin, the latch bar being spaced from the top of the shield and the forward end of the the latch member projecting beyond the sides of said shield when the parts are interlocked, so that said projecting end may be lifted by the finger to release the latch and disconnect the coupling.

ISRAEL NESSON.

REFERENCES CITED

The following references are of record in the file of this patent:

UNITED STATES PATENTS

| Number | Name | Date |
|---|---|---|
| Re. 8,925 | Potts | Oct. 7, 1879 |
| 697,682 | Smith | Apr. 15, 1902 |
| 2,156,506 | Marcolivio | May 2, 1939 |
| 2,170,939 | Christen | Aug. 29, 1939 |
| 2,172,928 | Anderson | Sept. 12, 1939 |
| 2,234,791 | Zaiger | Mar. 11, 1941 |